J. HEMINGWAY.
Improvement in Measuring Attachments for Thrashing-Machines.
No. 128,622. Patented July 2, 1872.
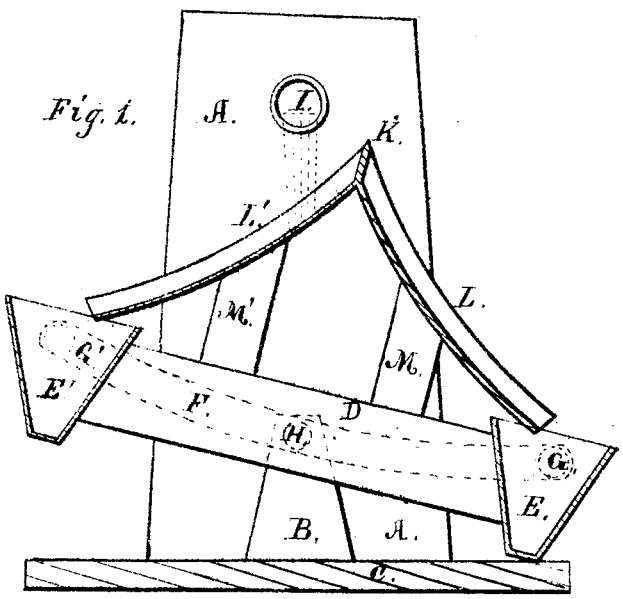

UNITED STATES PATENT OFFICE.

JOSIAH HEMINGWAY, OF BURNSIDES, ILLINOIS.

IMPROVEMENT IN MEASURING ATTACHMENTS FOR THRASHING-MACHINES.

Specification forming part of Letters Patent No. 128,622, dated July 2, 1872.

*To all whom it may concern:*

I, JOSIAH HEMINGWAY, of Burnsides, Illinois, have made a new and useful Improvement in Thrashing-Machines, &c., of which the following is a specification:

The object of this invention is to automatically weigh the grain as it runs from a thrashing-machine, &c., into measure, and shut off or change the stream from one measure to another when it contains the right weight, instead of measuring by space only and trusting to an attendant to make the changes properly. To do this an attachment is made to the thrasher, constructed as set forth hereinafter, referring to the accompanying drawing, in which—

Figure 1 is a sectional elevation of the attachment.

To the side of the thrashing-machine, or place where the grain is to be weighed, A, is attached a part, B, in any suitable manner. This part has a platform, C, which supports a pivoted scales-platform, D, on each end of which is a measure or vessel, E E', to receive the grain, arranged so as to be movable for emptying. On the same platform D is a weight-course, F, so made that a ball-weight, G, may freely roll therein from one end to the other, and thus from one side of the scales to the other. This is arranged so that when the ball is at either end, that end being down, a certain weight of grain must run into the measure on the opposite end to tilt the scales on the pivot H, when the ball G will roll to the other end and require an equal amount of grain to run into the opposite measure to reverse the action again, during which time the first measure may be discharged. The spout I from which the grain issues, is arranged over the center pivot H, and the part D bears an elevated part, K, which moves, as the scales tilt, from one side of the spout I to the other, and thus changes the side into which the grain is received, a spout running from this part down to each measure, as L L'. A registering apparatus may be connected with this to keep the count of measures taken; and, if desired, the measures may be made self-discharging.

I do not claim as new the general construction of the apparatus shown; but

What I claim as an improvement upon similar machines heretofore devised is—

The central spout I, discharge-spouts L L', measuring-boxes E E', and tilting-beam D provided with way F and ball-weight G, when said way is laid in the descending curve and all the above-designated parts are arranged with regard to each other, as and for the purpose set forth.

JOSIAH HEMINGWAY.

Witnesses:
SAMUEL JACOB WALLACE,
GEO. W. HORTON.